United States Patent
Botea et al.

(10) Patent No.: US 9,702,714 B2
(45) Date of Patent: Jul. 11, 2017

(54) ROUTING OF VEHICLE FOR HIRE TO DYNAMIC PICKUP LOCATION

(71) Applicant: INTERNATIONAL BUSINESS MACHINES CORPORATION, Armonk, NY (US)

(72) Inventors: Adi Botea, Dublin (IE); Fan Xie, Edmonton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/958,446

(22) Filed: Dec. 3, 2015

(65) Prior Publication Data
US 2017/0160092 A1 Jun. 8, 2017

(51) Int. Cl.
G01C 21/00 (2006.01)
G06Q 30/00 (2012.01)
G01C 21/34 (2006.01)
G01C 21/36 (2006.01)

(52) U.S. Cl.
CPC ..... *G01C 21/3407* (2013.01); *G01C 21/3667* (2013.01); *G01C 21/3691* (2013.01)

(58) Field of Classification Search
USPC .......................................... 701/423; 705/338
See application file for complete search history.

(56) References Cited

U.S. PATENT DOCUMENTS

| 7,050,909 B2 | 5/2006 | Nichols et al. |
| 8,442,848 B2 | 5/2013 | Myr |
| 2012/0041675 A1 | 2/2012 | Juliver et al. |

(Continued)

FOREIGN PATENT DOCUMENTS

| CN | 1494040 | 5/2004 |
| CN | 1278501 | 10/2006 |

(Continued)

OTHER PUBLICATIONS

"Location-aware checkin, seat assignment, rebooking and secure, authorized notification of passenger transfer and pickup", IP.com, IPCOM000219059D, Jul. 23, 2012.

(Continued)

*Primary Examiner* — Thomas G Black
*Assistant Examiner* — Tyler Paige
(74) *Attorney, Agent, or Firm* — F. Chau & Associates, LLC (57) ABSTRACT

A method for routing a vehicle for hire includes receiving a request to pick up a passenger at a predetermined time. Information indicating a first location of the passenger is received. The vehicle is routed to the first location at the calculated dispatch time. Information indicating a second location of the passenger is received. It is determined whether the second location jeopardized a timely pickup. The vehicle is rerouted to the second location when it is determined that the second location does not jeopardize the timely pickup. A notification is sent to the passenger warning that the second present location jeopardizes the timely pickup and the passenger is provided with directions on how to move to a location that does not jeopardize the timely pickup when it is determined that the second location of the passenger does jeopardize the timely pickup.

20 Claims, 4 Drawing Sheets

(56) References Cited

U.S. PATENT DOCUMENTS

| | | | | |
|---|---|---|---|---|
| 2013/0246301 A1* | 9/2013 | Radhakrishnan | .. | G06Q 30/0282 705/347 |
| 2014/0074743 A1* | 3/2014 | Rademaker | ............ | G06Q 50/28 705/334 |
| 2015/0161564 A1* | 6/2015 | Sweeney | ........ | G06Q 10/063114 705/338 |
| 2015/0161752 A1* | 6/2015 | Barreto | .................. | G06Q 50/30 705/7.15 |
| 2015/0262430 A1* | 9/2015 | Farrelly | ................ | H04L 67/306 705/13 |

FOREIGN PATENT DOCUMENTS

| | | |
|---|---|---|
| CN | 202887470 | 4/2013 |
| CN | 103218634 | 7/2013 |

OTHER PUBLICATIONS

Panagiotis Bouros, et al., "Dynamic Pickup and Delivery with Transfers", pp. 1-18, Greece, 2011.
Gerardo Berbeglia, et al., "Dynamic pickup and delivery problems", Nov. 18, 2010, pp. 1-24, Canada.

\* cited by examiner

No Directive Issued

Issue Advisory

Issue Directive to Return

ROUTING OF VEHICLE FOR HIRE TO DYNAMIC PICKUP LOCATION

BACKGROUND

1. Technical Field

The present disclosure relates to vehicle routing and, more specifically, to routing of vehicles for hire to a pickup location that continuously changes.

2. Discussion of Related Art

A vehicle for hire is a vehicle, such as an automobile, that is driven by a professional driver, whose job it is to pick up one or more passengers and transport them to a desired destination that is provided by the passengers. One common example of a vehicle for hire is a taxicab, also known as a "taxi." In some regions, such as New York City, a distinction is made between a taxi, which is permitted to pick up passengers who hail the taxi as it drives, and a car service, for which pickup locations and times are prearranged. However, in most other regions, automobiles acting as vehicles for hire are referred to as taxis regardless of whether passenger pickup is prearranged or hailed.

Where a passenger has made prior arrangements with a taxi for pickup at a specified time and location, the passenger is obliged to be at the prearranged location at the prearranged time. For example, a passenger who intends to see a play may make arrangements to be picked up at a theatre at the scheduled end time of the play. However, upon the ending of the play, the passenger may be obliged to wait at the prearranged pickup location or must contact the taxi to see if an alternative pickup location can be arranged.

Accordingly, even though the passenger may prefer to walk around the area rather than stay at the prearranged pickup location, it may not be practical for the passenger to do so.

BRIEF SUMMARY

A method for routing a vehicle for hire includes receiving a request to pick up a passenger at a predetermined time. Location information indicating a first present location of the passenger is received from an electronic mobile device carried by the passenger. A dispatch time is calculated based on a location of the vehicle for hire, the first present location of the passenger. The vehicle for hire is routed to the first present location of the passenger, at the calculated dispatch time. Location information indicating a second present location of the passenger different from the first present location of the passenger is received from the electronic mobile device carried by the passenger. It is determined whether the second present location of the passenger jeopardized a timely pickup of the passenger at the predetermined time. The vehicle for hire is rerouted to the passenger at the second location when it is determined that the second present location of the passenger does not jeopardize the timely pickup of the passenger at the predetermined time. A notification is sent to the passenger warning the passenger that the second present location jeopardizes the timely pickup and providing the passenger with directions on how to move to a location that does not jeopardize the timely pickup of the passenger when it is determined that the second present location of the passenger does jeopardize the timely pickup of the passenger at the predetermined time.

The method may additionally include receiving real-time traffic condition information, and the received real-time traffic condition information may be used in calculating the dispatch time, routing the vehicle for hire to the first present location of the passenger, and determining whether the second present location of the passenger jeopardized a timely pickup of the passenger at the predetermined time.

The real-time traffic condition information may be received from a traffic monitoring service over an electronic computer network.

The predetermined time may either be specified by the passenger or computed based on a desired arrival time at a destination and an estimated driving time required to arrive at the destination.

The request to pick up the passenger at the predetermined time may be received from the electronic mobile device carried by the passenger.

The location information indicating the first and second present locations of the passenger may be calculated by a global positioning service (GPS) receiver disposed within the electronic mobile device carried by the passenger.

The electronic mobile device carried by the passenger may count down a present length of time until the calculated dispatch time.

The electronic mobile device carried by the passenger may display a map differentiating between a first set of locations that the passenger can travel to without jeopardizing the timely pickup of the passenger at the predetermined time and a second set of locations that the passenger cannot travel to timely pickup of the passenger at the predetermined time, the map being generated based on received the real-time traffic information.

The displayed map may be updated based on changes to the real-time traffic information or the present location of the passenger.

The method may further include receiving location information indicating a third present location of the passenger different from the second present location of the passenger from the electronic mobile device carried by the passenger. It may be determined whether the third present location of the passenger jeopardizes the timely pickup of the passenger at the predetermined time based on received real-time traffic condition information. The vehicle for hire may be routed to the passenger at the third location when it is determined that the third present location of the passenger does not jeopardize the timely pickup of the passenger at the predetermined time. A notification may be sent to the passenger warning the passenger that the third present location jeopardizes the timely pickup and providing the passenger with directions on how to move to a location that does not jeopardize the timely pickup of the passenger when it is determined that the third present location of the passenger does jeopardize the timely pickup of the passenger at the predetermined time.

When sending the notification to the passenger warning the passenger that the second present location jeopardizes the timely pickup, the passenger may be given an opportunity to accept a delayed pickup time.

The first and second present location information may be acquired by an application executing on the electronic mobile device carried by the passenger and the application displays the map and the notification.

The steps of the method may be performed by a central server in communication with the electronic mobile device carried by the passenger, the vehicle for hire, and a service providing real-time traffic information, over a computer network.

The present location of the passenger may be continuously or periodically monitored from a time prior to the dispatch of the vehicle for hire till a time at which the passenger is picked up.

The routing of the vehicle for hire to the first and second present location may be performed using route information from a compressed path database.

The map may illustrate the locations of various attractions or waiting spots that the passenger can travel to without jeopardizing the timely pickup of the passenger.

The routing of the vehicle for hire to the first and second present location of the passenger may be performed using a multi-hunter, multi-prey search algorithm.

A computer system includes a processor and a non-transitory, tangible, program storage medium, readable by the computer system, embodying a program of instructions executable by the processor to perform method steps for routing a vehicle for hire. The method includes receiving a request to pick up a passenger at a predetermined time from a mobile application executing on an electronic mobile device of the passenger, receiving real-time traffic condition information from a traffic information service, receiving location information indicating a first present location of the passenger from the mobile application, calculating a dispatch time based on a location of the vehicle for hire, the first present location of the passenger, and the real-time traffic information, routing the vehicle for hire to the first present location of the passenger, at the calculated dispatch time, based on the real-time traffic condition information, receiving location information indicating a second present location of the passenger different from the first present location of the passenger from the mobile application, determining whether the second present location of the passenger jeopardized a timely pickup of the passenger at the predetermined time using the real-time traffic condition information, rerouting the vehicle for hire to the passenger at the second location when it is determined that the second present location of the passenger does not jeopardize the timely pickup of the passenger at the predetermined time, and displaying a notification to the mobile application warning the passenger that the second present location jeopardizes the timely pickup and displaying directions on how to move to a location that does not jeopardize the timely pickup of the passenger when it is determined that the second present location of the passenger does jeopardize the timely pickup of the passenger at the predetermined time.

The mobile application may display a map differentiating between a first set of locations that the passenger can travel to without jeopardizing the timely pickup of the passenger at the predetermined time and a second set of locations that the passenger cannot travel to timely pickup of the passenger at the predetermined time, the map being generated based on the real-time traffic information.

The mobile application may display a user interface element for permitting the passenger to accept a delayed pickup time when it is determined that the second present location of the passenger jeopardized a timely pickup of the passenger.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Figure 1:
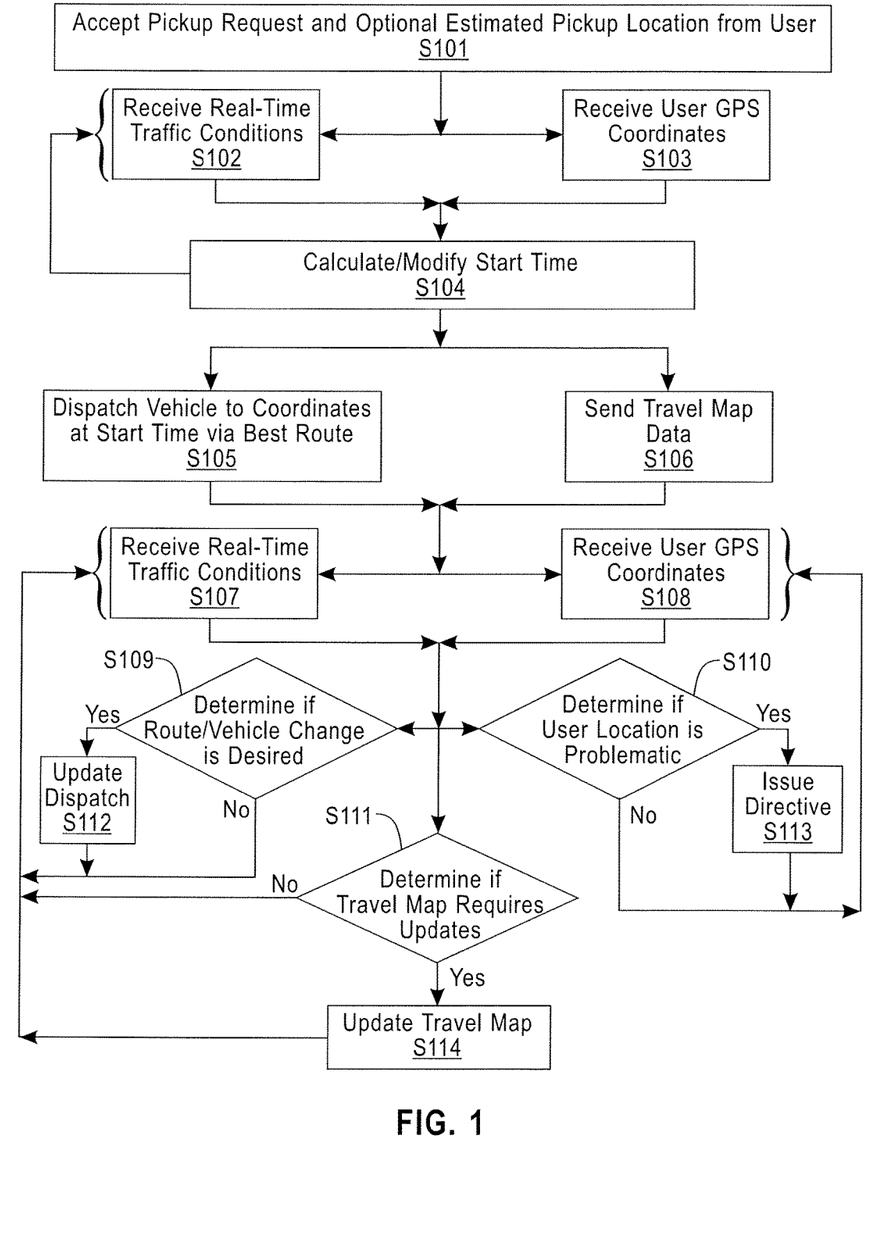
FIG. 1 is a flowchart illustrating an approach for dispatching and routing vehicles for hire to a passenger at a dynamic pickup location in accordance with exemplary embodiments of the present invention.

Exemplary embodiments of the present invention seek to provide a system and method for dispatching and routing vehicles for hire to a passenger at a dynamic pickup location so that the passenger may be free to move about while awaiting pickup. FIG. 1 is a flowchart illustrating an approach for dispatching and routing vehicles for hire to a passenger at a dynamic pickup location in accordance with exemplary embodiments of the present invention.

First, one or more passengers (referred to herein as the "passenger") may contact a vehicle for hire (referred to herein as a "taxi") service to make arrangements for a pickup. These arrangements may be made, for example, by a telephone call, an electronic message such as an email, text message, etc. or via a mobile application running on a smartphone of the passenger. The arrangements may include a requested pickup time and may optionally also include an estimated pickup location. The taxi dispatch system may receive and accept the request from the passenger (Step S101). The acceptance of the request may be based on vehicle availability of the taxi service. As the mobile application may allow for direct access to a scheduling and dispatch system of the taxi service, for example, via a central server which acts as an intermediary, the passenger using the mobile application may be able to quickly and conveniently schedule the pickup.

The mobile application may be published by the taxi service itself or may be published by an intermediary. The intermediary may maintain a registry of passengers and taxis and may facilitate the interactions, services, and payments. Thus the intermediary, or the taxi service itself, may maintain one or more central servers for these purposes.

For as long as the arranged pickup time is not imminent, no further interaction between the mobile application and the taxi service may be required. However, when the arranged pickup time is sufficiently imminent, for example, by comparing the present time to the arranged pickup time and determining whether the difference meets a predetermined threshold value, the central server may begin to receive real-time traffic conditions for the region in which the taxi service and/or the estimated pickup location is within (Step S102) and the central server may begin to receive periodic location coordinates from the mobile application (Step S103).

The real-time traffic conditions data may be received from a traffic monitoring service, for example, over the Internet. The real-time traffic condition data may be used by the central server to determine an amount of time needed to reach the passenger at either the estimated pickup location or the received passenger location.

The passenger location data may be acquired by the mobile application by receiving location coordinates from a GPS module within the smartphone or other mobile device of the passenger that is responsible for executing the mobile application. An operating system of the smartphone may handle the actual ascertaining of the location and the mobile application may be able to access this data from the operating system using one or more application programming interfaces (APIs). The operating system of the smartphone may determine the location of the smartphone using GPS and/or another suitable means such as cellular phone tower proximity, near field commination (NFC) detection of a transceiver of a known location, etc.

An estimated pickup location is an optional feature of the transportation request, as the dispatch time for the taxi may be calculated to an actual location of the passenger. However, the estimated pickup location may be used, for example, to determine whether the passenger intends to be picked up within an operating area of the taxi service at the time of making the reservation, or to better match a passenger to a taxi service.

The reception of the traffic conditions and the user location may be repeated at periodic intervals. A dispatch time may then be calculated based on the location and traffic conditions (Step S104). The dispatch time may be a time in which the vehicle being dispatched must leave in order to arrive at the passenger at or near the designated pickup time, given the present traffic conditions, the passengers present location, and the location of the vehicle being dispatched. The dispatch time may also be affected by a selection of which vehicle to dispatch and this selection may also be dynamic and subject to frequent change.

The steps of receiving traffic condition data (Step S102), receiving passenger location (Step S103), and determining the dispatch time may be repeated until the latest dispatch time is at hand. At that time, the selected vehicle may be dispatched to the most recently received location of the passenger (Step S105).

However, according to exemplary embodiments of the present invention, the passenger is not obliged to remain at a static pickup location. The passenger may travel about, for example, by walking, and may engage in various activities such as shopping or patronizing a coffee shop. There may be limits placed on where the passenger may be free to travel, and these limits may be based on the real-time traffic conditions, the available roadways that the taxi is free to use, and the restrictions placed on these roadways such as one-way traffic requirements, no turning requirements, etc. Accordingly, exemplary embodiments of the present invention may have the central server transmit information to the mobile application such that the mobile application may display, for the passenger, a map illustrating regions in which the passenger may be free to move within without jeopardizing the pickup time (Step S106).

The central server may continue to receive real-time traffic condition updates (Step S107) and passenger location updates (Step S108). This information may then be used to: determine if a route and/or vehicle selection should be changed (Step S109); determine if the passenger has moved to, or appears likely to move to, a region that would jeopardize the pickup time (Step S110); and determine if the travel map of the passenger needs to be updated (Step S111).

If it is determined that the route and/or vehicle selection should be changed (Yes, Step S109), then the dispatch may be updated accordingly (Step S112) and monitoring of traffic and passenger location may continue (Steps S107 and S108). If, however, it is determined that the route and/or vehicle selection need not be changed (No, Step S109) then monitoring may continue without updating the dispatch.

If it is determined that the passenger's present location may adversely affect the taxi's ability to pick up the passenger at the prearranged time (Yes, Step S110), then a warning message and/or directive may be provided to the passenger via the mobile application to make the passenger aware of this detail and, optionally, to provide a recommendation on remedial action that may be taken. The passenger may also be given the opportunity to accept a modified pickup time. Monitoring of traffic and passenger location may continue (Steps S107 and S108). If, however, it is determined that the user location is not problematic (No, Step S110), monitoring may continue without issuing the warning/directive.

If it is determined that the travel map requires updates (Yes, Step S111), for example, because the traffic conditions have changed or changes made to the dispatch affect the time needed for the taxi to meet the passenger, then the travel map may be updated (Step S114) and monitoring of traffic and passenger location may continue (Steps S107 and S108). The passenger may then be alerted as to the changes made. If, however, it is determined that the travel map does not need to be updated (No, Step S112), then the monitoring may continue without changing the travel map.

In any event, monitoring may continue until such time as the passenger is picked up by the taxi or the pickup request is canceled.

Figure 2:
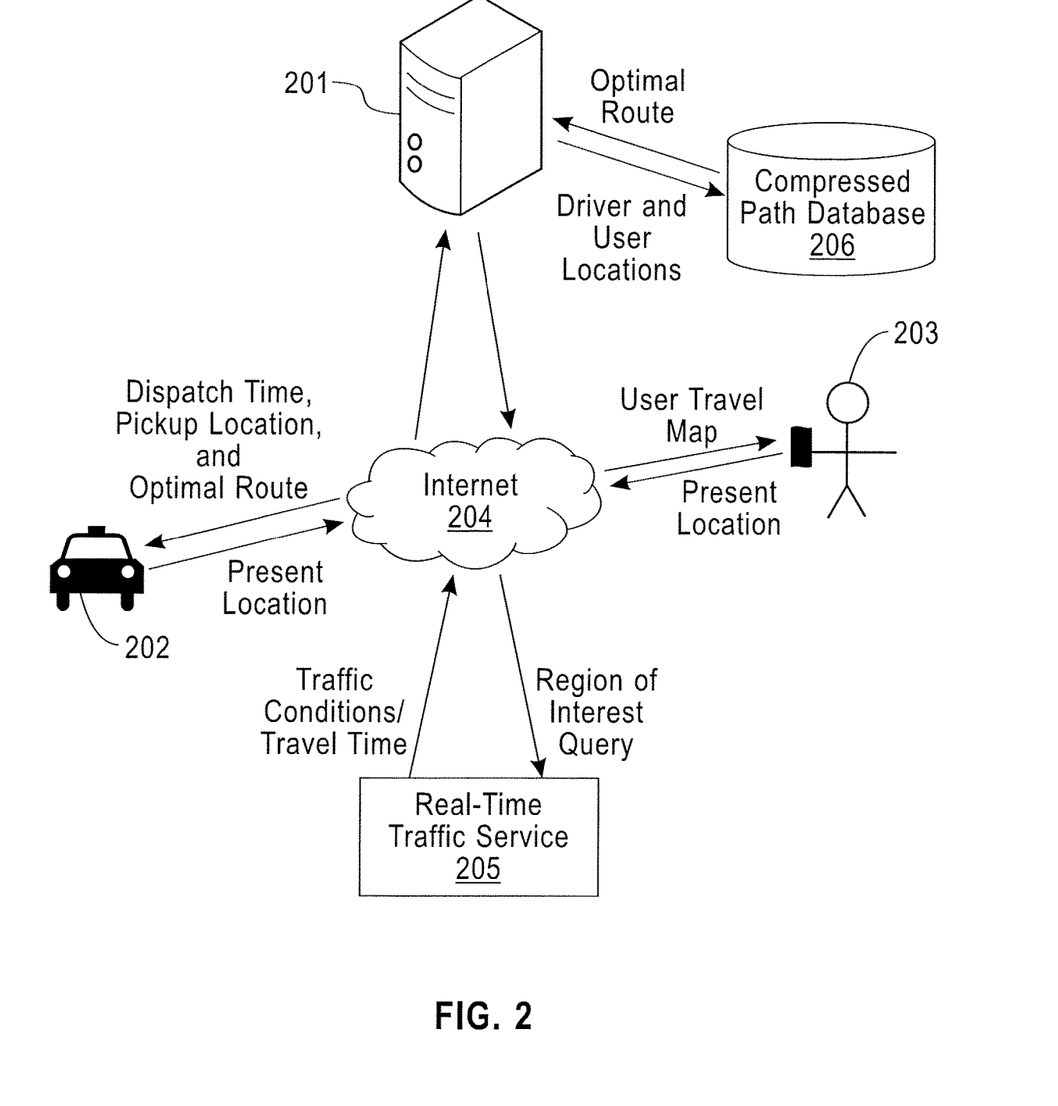
FIG. 2 is a schematic diagram illustrating a system for dispatching and routing vehicles for hire to a passenger at a dynamic pickup location in accordance with exemplary embodiments of the present invention.

FIG. 2 is a schematic diagram illustrating a system for dispatching and routing vehicles for hire to a passenger at a dynamic pickup location in accordance with exemplary embodiments of the present invention. As described above, the central server 201 may be responsible for performing the method steps illustrated in FIG. 1. The central server 201 may be embodied as a single server, a distributed server, or a virtual machine. The central server 201 may be in communication with a vehicle 202, for example, over a computer network such as the Internet 204. The central server may receive real-time traffic data from a service providing this data 205, which may be made available, for example, over the wireless network 204. The passenger and the electronic mobile device 203 may be in communication with the central server 201 over the wireless network 204, for example, via a wireless telephone/data service provider.

According to exemplary embodiments of the present invention, the passenger/mobile device 203 may periodically send out location information via the mobile application. This information may be received by the central server 201 via the computer network 204. The real-time traffic service 205 may provide traffic condition data to the central server 201 via the computer network 204 and this information, along with the location information, may be used to create dispatch information which may be sent to the vehicle 202, for example, over the computer network 204.

Route guidance may either be performed by a navigation system within the vehicle 202 or route guidance may be provided by the central server 201. To speed up route guidance, a database of compressed path information 206 may be consulted. Compressed path information may be a pre-determined best route between a present location of the vehicle 202 and a present location of the passenger 203. Alternatively, a best route may be calculated with reference to the real-time traffic information, which may also be provided directly to the navigation system of the vehicle 202. The user travel map may either be sent from the central server 201 directly to the passenger/mobile device 203 or information for building this map may be sent to the passenger/mobile device 203, with the mobile application executing on the mobile device being responsible for rendering the user travel map.

Figure 3:
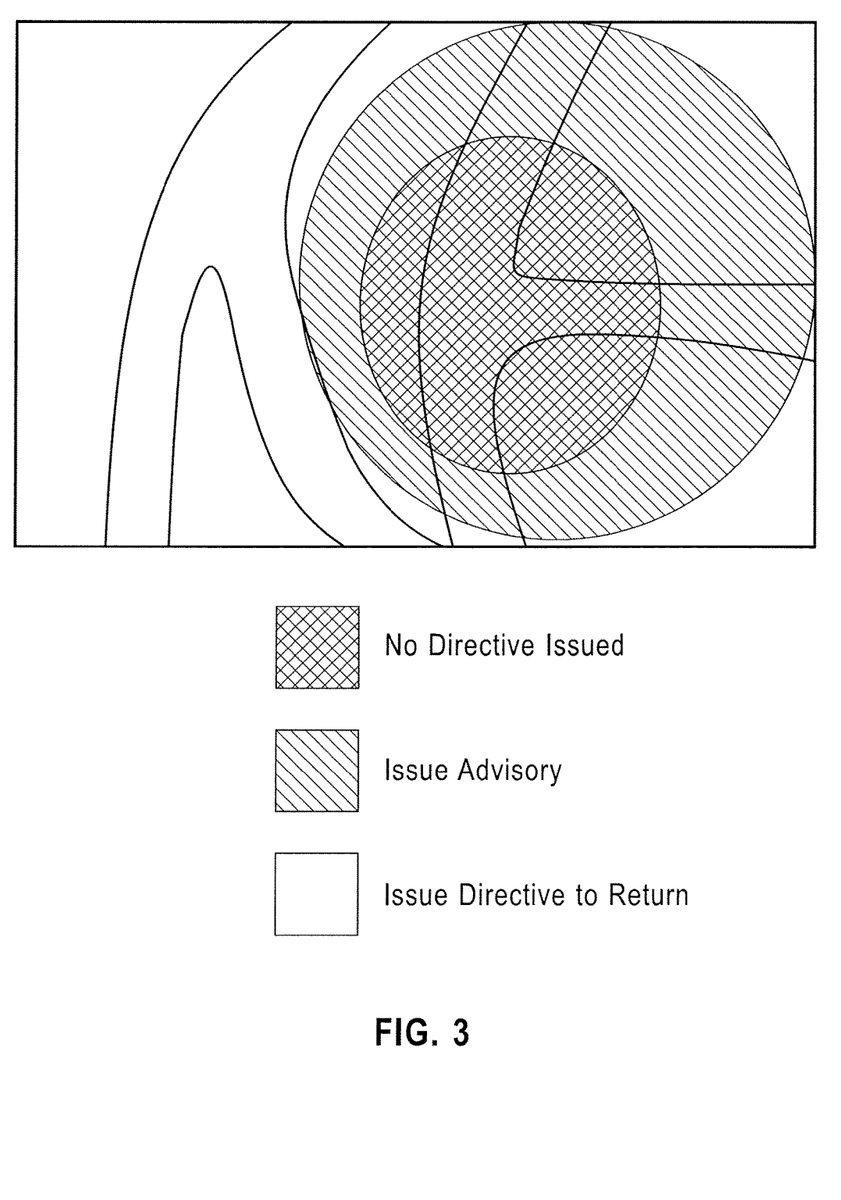
FIG. 3 is an illustration of a user travel map in accordance with exemplary embodiments of the present invention.

FIG. 3 is an illustration of a user travel map in accordance with exemplary embodiments of the present invention. As can be appreciated from this map, an area surrounding the present location of the passenger may be displayed and this area may be divided into color-coded sections which may represent a level of certainty for being able to receive the taxi at the predetermined time. According to a most simple embodiment of this concept, the map may include two colored areas, with one color representing the places the passenger may move to without risking the pickup time, and another color representing the places the passenger should not move to. However, other embodiments of the user travel map may include more than two color coded sections. In the illustration of FIG. 3, for example, a first colored area may indicate that no directive is to be issued. Thus if the passenger stays within this area then the mobile application will not issue a warning to the passenger. A second colored area may indicate that if the passenger enters this area, a warning message or advisory may be issued to inform he passenger that they are beyond the preferred area and pickup may require additional time. A third colored area may indicate that the taxi is unable to reach the passenger within this region and the passenger should return to within the designated region in order for pickup to be performed. This third colored area may include regions that are not accessible to motor traffic such as large parks and the like.

According to one exemplary embodiment of the present invention, the user travel map may be annotated with different estimated pickup times so that the passenger may understand how moving to a given location will affect the pickup time. The map may also indicate an estimated drop off time next to the estimated pickup time so the passenger may understand how moving to a given location will affect the time in which they are to arrive at their destination.

Additionally, the user travel map may depict various attractions and waiting spots that the passenger may wish to occupy while waiting for the pickup that are all within the preferred region within which no directive is issued. For example, coffee shops, tourist attractions, libraries, etc. may all be highlighted on the user travel map. The mobile application may allow for the passenger to select an attraction and the mobile application may provide directions for getting to the selected attraction from the present location of the passenger. Similarly, the mobile application may allow the passenger to select a desired suitable location to meet the taxi at and may provide direction to this selected location.

While exemplary embodiments of the present invention are described above in terms of a single passenger waiting for a single taxi dispatched by a single taxi service company, exemplary embodiments of the present invention are not limited to this particular arrangement. For example, the central servers described above may contract out the services of multiple taxi service companies and/or individual taxi drivers. However, as a pickup may be prearranged with a particular taxi service company, and this particular taxi service company may have multiple taxis and multiple prearranged pickups, exemplary embodiments of the present invention are directed to the dispatching and routing of multiple vehicles to multiple dynamic pickup locations.

According to exemplary embodiments of the present invention, the central server may utilize one or more multi-hunter, multi-prey search algorithms to effectively route one of a plurality of available vehicles to each waiting passenger while selecting an optimum path of interception. Additionally, the central server may utilize one or more algorithms for determining an optimal dispatch time for chasing the moving target.

Moreover, exemplary embodiments of the present invention may utilize the infrastructure of the system described above to provide various related services to the passengers, such as alerting the passengers to potential delays in pickup or potential delays in traveling between pickup and drop off that are attributable to traffic conditions. The data received from the real-time traffic service may be used to generate these warnings. This data may also be used to inform the passenger, via the mobile application, of estimated pickup and drop off times, and to update these times as needed.

The mobile application may have uses besides relaying location data of the passenger to the central server and displaying the user travel map to the passenger. For example, as described above, the mobile application may be used by the passenger to make the pickup reservation. The mobile application may also be used by the passenger to process payment for the transportation. Additionally, in the time between the making of the reservation and the passenger pickup, the mobile application may be used to display a countdown of time until the pickup occurs. This countdown may be based on an estimation and the estimation may be updated to increase in accuracy as the time of pickup gets closer. Then, when the taxi arrives at the location of the passenger, the mobile application may send an alert to the passenger instructing the passenger to board the taxi. The mobile application may also provide the passenger with useful details relating to the appearance and identity of the taxi and its driver.

Figure 4:
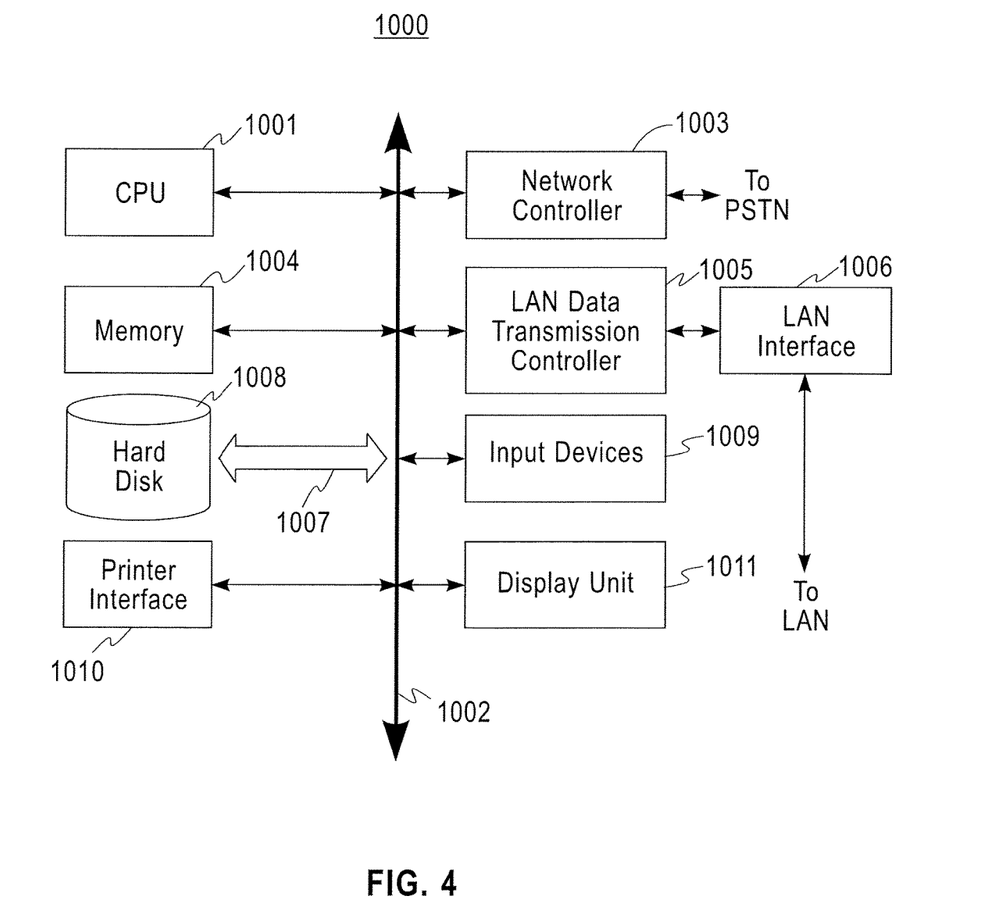
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for routing a vehicle for hire, comprising:
   receiving a request to pick up a predetermined passenger at a predetermined time;
   receiving location information indicating a first present location of the predetermined passenger from an electronic mobile device carried by the predetermined passenger;
   calculating a dispatch time based on a location of the vehicle for hire, and the first present location of the predetermined passenger;
   routing the vehicle for hire to the first present location of the predetermined passenger, at the calculated dispatch time;
   receiving location information indicating that the predetermined passenger has moved from the first present location to a second present location that is different from the first present location, from the electronic mobile device carried by the predetermined passenger;

determining whether the second present location of the predetermined passenger jeopardized a timely pickup of the predetermined passenger at the predetermined time;

rerouting the vehicle for hire, while in route to the first location to the predetermined passenger at the second location when it is determined that the second present location of the predetermined passenger does not jeopardize the timely pickup of the predetermined passenger at the predetermined time; and sending a notification to the predetermined passenger warning the predetermined passenger that the second present location jeopardizes the timely pickup and providing the predetermined passenger with directions on how to move to a location that does not jeopardize the timely pickup of the predetermined passenger when it is determined that the second present location of the predetermined passenger does jeopardize the timely pickup of the predetermined passenger at the predetermined time.

2. The method of claim 1, additionally comprising receiving real-time traffic condition information, and wherein the received real-time traffic condition information is used in calculating the dispatch time, routing the vehicle for hire to the first present location of the predetermined passenger, and determining whether the second present location of the predetermined passenger jeopardized a timely pickup of the predetermined passenger at the predetermined time.

3. The method of claim 2, wherein the real-time traffic condition information is received from a traffic monitoring service over an electronic computer network.

4. The method of claim 1, wherein the predetermined time is either specified by the predetermined passenger or computed based on a desired arrival time at a destination and an estimated driving time required to arrive at the destination.

5. The method of claim 1, wherein the request to pick up the predetermined passenger at the predetermined time is received from the electronic mobile device carried by the predetermined passenger.

6. The method of claim 1, wherein the location information indicating the first and second present locations of the predetermined passenger are calculated by a global positioning service (GPS) receiver disposed within the electronic mobile device carried by the predetermined passenger.

7. The method of claim 1, wherein the electronic mobile device carried by the predetermined passenger counts down a present length of time until the calculated dispatch time.

8. The method of claim 1, wherein the electronic mobile device carried by the predetermined passenger displays a map differentiating between a first set of locations that the predetermined passenger can travel to without jeopardizing the timely pickup of the predetermined passenger at the predetermined time and a second set of locations that the predetermined passenger cannot travel to timely pickup of the predetermined passenger at the predetermined time, the map being generated based on received the real-time traffic information.

9. The method of claim 8, wherein the displayed map is updated based on changes to the real-time traffic information or the present location of the predetermined passenger.

10. The method of claim 1, further comprising:
receiving location information indicating a third present location of the predetermined passenger different from the second present location of the predetermined passenger from the electronic mobile device carried by the predetermined passenger;

determining whether the third present location of the predetermined passenger jeopardizes the timely pickup of the predetermined passenger at the predetermined time based on received real-time traffic condition information;

rerouting the vehicle for hire to the predetermined passenger at the third location when it is determined that the third present location of the predetermined passenger does not jeopardize the timely pickup of the predetermined passenger at the predetermined time; and sending a notification to the predetermined passenger warning the predetermined passenger that the third present location jeopardizes the timely pickup and providing the predetermined passenger with directions on how to move to a location that does not jeopardize the timely pickup of the predetermined passenger when it is determined that the third present location of the predetermined passenger does jeopardize the timely pickup of the predetermined passenger at the predetermined time.

11. The method of claim 1, wherein when sending the notification to the predetermined passenger warning the predetermined passenger that the second present location jeopardizes the timely pickup, the predetermined passenger is given an opportunity to accept a delayed pickup time.

12. The method of claim 1, wherein the first and second present location information is acquired by an application executing on the electronic mobile device carried by the predetermined passenger and the application displays the map and the notification.

13. The method of claim 1, wherein the steps of the method are performed by a central server in communication with: the electronic mobile device carried by the predetermined passenger; the vehicle for hire; and a service providing real-time traffic information, over a computer network.

14. The method of claim 1, wherein the present location of the predetermined passenger is continuously or periodically monitored from a time prior to the dispatch of the vehicle for hire till a time at which the predetermined passenger is picked up.

15. The method of claim 1, wherein the routing of the vehicle for hire to the first and second present location is performed using route information from a compressed path database.

16. The method of claim 1, wherein the map illustrates the locations of various attractions or waiting spots that the predetermined passenger can travel to without jeopardizing the timely pickup of the predetermined passenger.

17. The method of claim 1, wherein the routing of the vehicle for hire to the first and second present location of the predetermined passenger is performed using a multi-hunter, multi-prey search algorithm.

18. A computer system comprising:
a processor, and
a non-transitory, tangible, program storage medium, readable by the computer system, embodying a program of instructions executable by the processor to perform method steps for routing a vehicle for hire, the method comprising:
receiving a request to pick up a predetermined passenger at a predetermined time from a mobile application executing on an electronic mobile device of the predetermined passenger;
receiving real-time traffic condition information from a traffic information service;

receiving location information indicating a first present location of the predetermined passenger from the mobile application;

calculating a dispatch time based on a location of the vehicle for hire, the first present location of the predetermined passenger, and the real-time traffic information;

routing the vehicle for hire to the first present location of the predetermined passenger, at the calculated dispatch time, based on the real-time traffic condition information;

receiving location information indicating that the predetermined passenger has moved from the first present location to a second present location that is different from the first present location, from the mobile application;

determining whether the second present location of the predetermined passenger jeopardized a timely pickup of the predetermined passenger at the predetermined time using the real-time traffic condition information;

rerouting the vehicle for hire, while in route to the first location, to the predetermined passenger at the second location when it is determined that the second present location of the predetermined passenger does not jeopardize the timely pickup of the predetermined passenger at the predetermined time; and displaying a notification to the mobile application warning the predetermined passenger that the second present location jeopardizes the timely pickup and displaying directions on how to move to a location that does not jeopardize the timely pickup of the predetermined passenger when it is determined that the second present location of the predetermined passenger does jeopardize the timely pickup of the predetermined passenger at the predetermined time.

19. The computer system of claim 18, wherein the mobile application displays a map differentiating between a first set of locations that the predetermined passenger can travel to without jeopardizing the timely pickup of the predetermined passenger at the predetermined time and a second set of locations that the predetermined passenger cannot travel to timely pickup of the predetermined passenger at the predetermined time, the map being generated based on the real-time traffic information.

20. The computer system of claim 18, wherein the mobile application displays a user interface element for permitting the predetermined passenger to accept a delayed pickup time when it is determined that the second present location of the predetermined passenger jeopardized a timely pickup of the predetermined passenger.

* * * * *